United States Patent
Hyland et al.

(10) Patent No.: US 7,143,597 B2
(45) Date of Patent: Dec. 5, 2006

(54) INDIRECT-DIRECT EVAPORATIVE COOLING SYSTEM OPERABLE FROM SUSTAINABLE ENERGY SOURCE

(75) Inventors: Samuel Hyland, Wilmington, DE (US); Robert F. Lobozo, New Castle, DE (US); Covington Stanwick, Aquasco, MD (US)

(73) Assignee: Speakman Company, New Castle, DE (US)

( * ) Notice: Subject to any disclaimer, the term of this patent is extended or adjusted under 35 U.S.C. 154(b) by 0 days.

(21) Appl. No.: 10/880,668

(22) Filed: Jun. 30, 2004

(65) Prior Publication Data
US 2006/0000227 A1    Jan. 5, 2006

(51) Int. Cl.
F28D 5/00     (2006.01)
(52) U.S. Cl. .......................................... 62/236; 62/314
(58) Field of Classification Search .............. 62/235.1, 62/236, 304–316; 136/291–293
See application file for complete search history.

(56) References Cited

U.S. PATENT DOCUMENTS

| | | | |
|---|---|---|---|
| 3,976,458 A * | 8/1976 | Krug ............................ | 62/175 |
| 4,281,515 A | 8/1981 | Ferriera | |
| 4,367,633 A * | 1/1983 | Strathman ................... | 62/236 |
| 4,427,607 A | 1/1984 | Korsell | |
| 4,474,028 A * | 10/1984 | Miller et al. ............... | 62/235.1 |
| 4,562,015 A | 12/1985 | Lefevre | |
| 4,658,597 A * | 4/1987 | Shum ........................ | 62/235.1 |
| 4,697,136 A | 9/1987 | Ishikawa | |
| 4,757,241 A | 7/1988 | Young | |
| 5,192,464 A | 3/1993 | Pawlowski et al. | |
| 5,349,829 A | 9/1994 | Tsimerman | |
| 5,501,083 A * | 3/1996 | Kim .......................... | 62/228.4 |
| 5,664,433 A | 9/1997 | Bourne et al. | |
| 5,762,129 A * | 6/1998 | Elliott ....................... | 165/48.1 |
| 6,574,975 B1 | 6/2003 | Bourne et al. | |
| 6,583,522 B1 | 6/2003 | McNulty et al. | |

\* cited by examiner

*Primary Examiner*—William E. Tapolcai
(74) *Attorney, Agent, or Firm*—Connolly Bove Lodge & Hutz LLP

(57) ABSTRACT

Improved means for powering and increasing evaporative cooling in an indirect-direct evaporative cooling (IDEC) apparatus are disclosed. Sustainable energy from solar energy mixed with grid power, when needed, power the IDEC device. These DC and AC power sources are seamlessly merged in a unique diode interconnect unit. Improved means for evaporative cooling include a rayon-based flocking on the wet side of molded plastic indirect evaporative cooling plates. Separate wet and dry passages through those plates are facilitated by a unique means for clamping the upper ends of the plates. These clamping means also add to the structural integrity of an array of plates so that the array can be inserted in and removed from a housing containing other operational components of the IDEC such as fan, direct cooling plates and water distribution means. Applicants IDEC utilizes improved porous piping that allows uniform and continuous distribution of water to all wet passages within both the indirect and direct stages of the IDEC. Operational controls for the system limit the potential water damage caused by overflow of water from the IDEC housing.

5 Claims, 6 Drawing Sheets

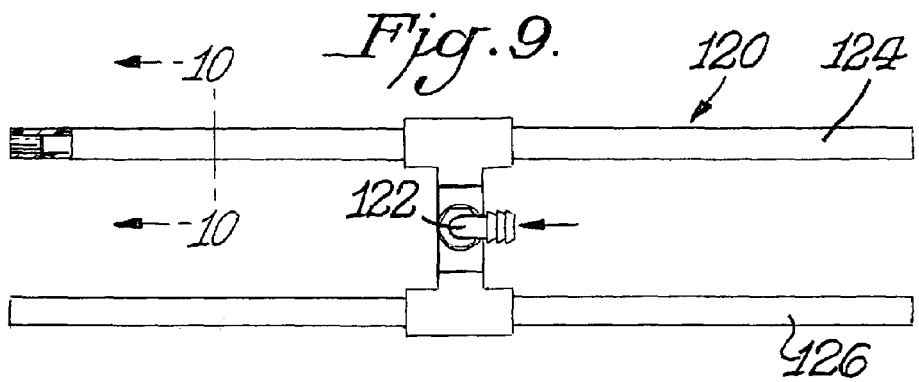
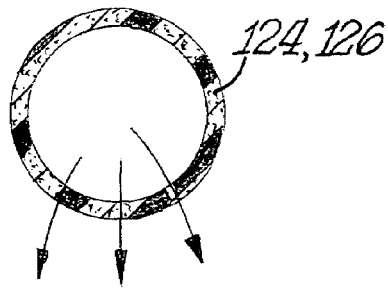
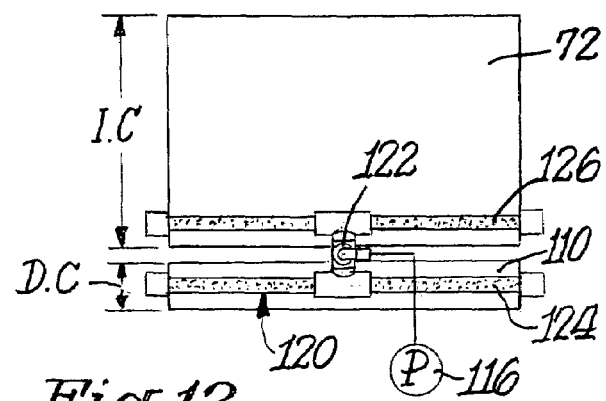
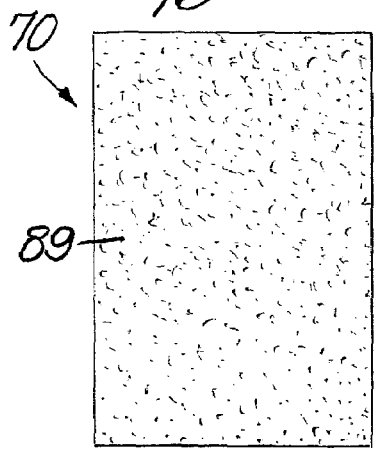
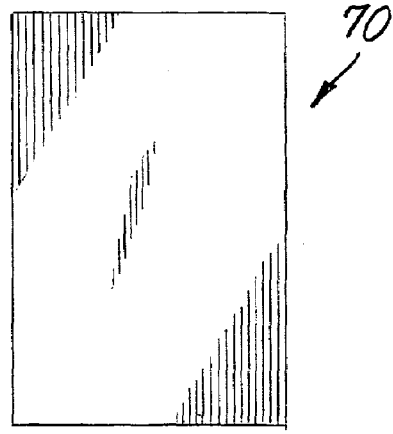

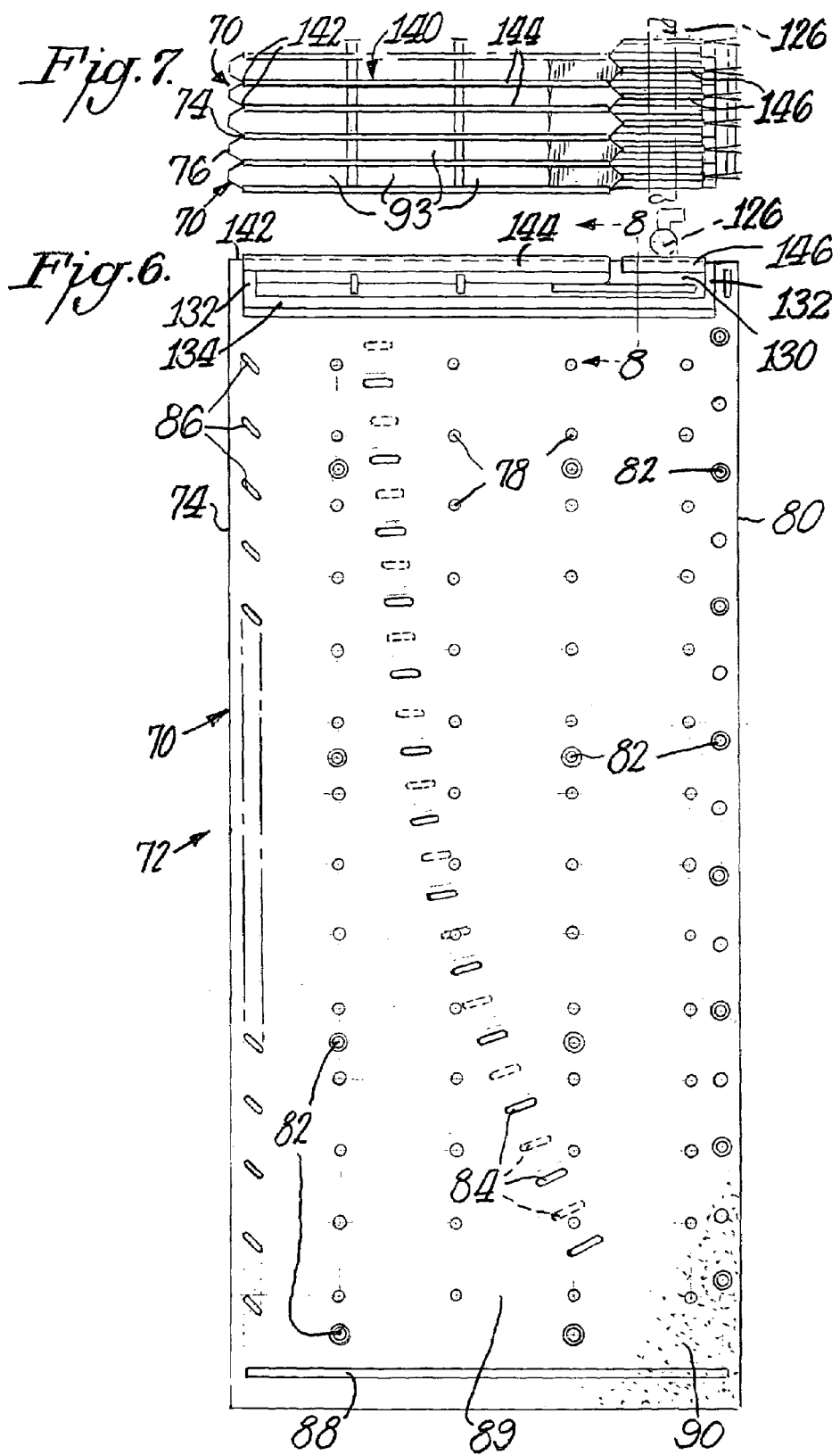

INDIRECT-DIRECT EVAPORATIVE COOLING SYSTEM OPERABLE FROM SUSTAINABLE ENERGY SOURCE

CROSS REFERENCE TO RELATED APPLICATIONS

Not applicable.

BACKGROUND OF THE INVENTION

This invention relates to a highly efficient system and apparatus for supplying conditioned air to an interior space. The system utilizes two stage evaporative cooling to deliver conditioned air to living and work spaces, namely indirect and direct cooling stages. Such cooling is often identified by the acronym IDEC which stands for indirect/direct evaporative cooling. This invention seamlessly draws operating power from multiple AC and DC sources including a utility power grid and/or sustainable energy sources such as solar panels. A unique combination of indirect stage heat exchanger plate coatings and water distribution manifolds enhances the operation of the IDEC apparatus used in the system.

Other IDEC systems are described below. For example, U.S. Pat. No. 5,664,433 issued Sep. 9, 1997 to Davis Energy Group, Inc. ("Davis I") describes an indirect-direct evaporative cooling apparatus with a single initial stream exiting a blower at the bottom of the apparatus that splits into primary and secondary streams that flow in a crossflow pattern through the indirect evaporative cooling stage. The primary air stream is directed horizontally through the indirect cooling stage and then through the direct cooling stage. The secondary air stream is directed vertically through the indirect cooling stage to evaporatively cool the air passing therethrough.

A pending application (Ser. No. 10737,823) assigned to the owners of U.S. Pat. No. 5,664,433, Davis Energy Group, Inc., ("Davis II") notes several limitations of the Davis I patent allegedly cured by the IDEC apparatus disclosed in that application. More specifically, Davis II relocates the air handling fan to the top of the apparatus which reduces air flow and water handling problems apparently experienced with apparatus disclosed in Davis I. Davis II also utilizes a crossflow air pattern for the indirect heat exchanger stage that simplifies the construction of the apparatus. According to Davis II, the crossflow of air also increases the air path distance which, in turn, increases the efficiency of the unit. Davis II also discloses a simplified internal plate structure for the indirect cooling stage which enables the plates to interlock into an assembly, yet maintain spacing of air (dry) and water (wet) channels on opposite sides of the plates.

Another patent assigned to the Davis Energy Group, Inc. is U.S. Pat. No. 6,574,975 issued Jun. 10, 2003 ("Davis III"). It discloses a system for distribution of water in an evaporative cooling apparatus. More particularly, water which drips through evaporative cooling plates is collected in a sump and recycled to a water distribution manifold above the plates. The manifold disclosed in Davis III is little more than a horizontal perforated pipe which sprays on the underside of a semi-circular distribution surface that disperses the sprayed water over the top of the evaporative cooling media. (See reference numbers 36a, 60 of FIG. 2).

Other approaches to water distribution above evaporative cooling media are discussed in U.S. Pat. No. 5,192,464 issued Mar. 9, 1993. This patent discloses water distribution conduits 66 with discharge slots 68 cut in the top thereof (FIG. 5 and column 4, lines 46–6). The water exiting those slots dribbles down in a rather uncontrolled fashion over the evaporative cooling media. In U.S. Pat. No. 5,349,829 water distribution manifolds 152, 162 contain a plurality of downwardly directed spray nozzles 154, 164 which discharge onto the top surface of the evaporative cooling media (FIG. 1; column 4, lines 56–67). Yet another water distribution system for an evaporative cooler is illustrated in U.S. Pat. No. 4,427,607. In this patent outlets are located in the water distribution manifold so that they align with the wet side of evaporative cooling media. Conversely the dry side of the media is isolated from such outlets. (See FIG. 3 and column 3, lines 11–67).

Another supplier of IDEC units is AdobeAir, Inc. of Phoenix, Ariz. which sells such units under the MASTERCOOL® trademark. AdobeAir's web page (www.adobe-.com) describes IDEC units with vertical fins which have water running therethrough to cool outside air passing over the outside of the fins One approach to powering cooling equipment, more particularly a regular compressor driven air conditioner, is illustrated in U.S. Pat. No. 4,697,136 issued on Sep. 29, 1987. In this patent solar panels are connected in series as a source of direct current (DC). This DC solar power is supplemented or replaced with a commercial alternating current (AC) power source to run the air conditioner. These dissimilar (AC and DC) power sources are wired through an inverter system that provides flexible utilization of DC solar power alone, DC in combination with AC power or AC power alone. Selection of power sources is determined by a controller which switches power sources and inverters into and out of the power supply to the cooling equipment as illustrated in the only drawing in the patent (See also column 2, lines 29–64). U.S. Pat. No. 6,583,522 issued Jun. 24, 2003 describes a switching system that permits control of solar power by selective configuration of solar panels into series, parallel or series—parallel arrangements. This switching system permits control of voltage and amperage out of the solar panel. Another use of solar power in a cooling system in disclosed in U.S. Pat. No. 4,281,515 issued Aug. 4, 1981 to Energy Wise, Inc. of Lodi, Calif. This patent discloses use of solar heat (not power) linked to the absorption refrigeration cycle of a cooling system.

SUMMARY OF THE INVENTION

Indirect/direct evaporative coolers are well suited for operation with sustainable energy, particularly solar power. More particularly, IDECs operate best in low humidity climates such as those found in the southwest quadrant of the United States. These areas of the country, coincidentally, have long periods of continuous sunshine that can be used to power solar panels. Thus, the marriage of solar power and IDECs offers a unique opportunity for cooling homes, offices, work places and factories in that portion of the United States at minimum cost because most operating power can be supplied by the sun. One form of solar panel suitable for use in this invention is that offered by First Solar, LLC Perryburg, Ohio (www.firstsolar.com). Even without solar power, the IDEC disclosed herein provides highly efficient cooling with about an eighty percent (80%) reduction in power consumption compared to vapor compression air conditioning systems. In the preferred embodiment of applicants' IDEC, both AC and DC are made available for its operation. The use of twin power sources is facilitated by a unique arrangement of components. Unlike the prior art approach discussed above, applicants achieve a seamless blend of solar (DC) and grid (AC) power sources without use of inverters. This arrangement allows applicants' IDEC to be run during peak afternoon sun loads at little or no cost because solar power supplies substantially all of the energy needed to operate the IDEC. As the sun sets, the temperature of outside air also lowers thereby reducing the amount of cooling needed. Thus, applicant's IDEC using solar power operates in synchronization with nature's daily rhythm to supply cooled air throughout the day at little or no cost.

These operational savings are also made possible by vastly improved water distribution and wetting within applicants' IDEC. A central operating principle of IDECs is the evaporation of water from one (wet) side of heat exchange plates within the indirect stage of the IDEC. The greater the area of evaporation the greater the cooling in this stage of the IDEC. To increase the area of evaporation it is important that the wet side of the heat exchange plates in an IDEC be completely and uniformly wetted. That goal is accomplished in this invention in several ways. First, the wet side of the heat exchange plates is coated with a unique flocked rayon-based material. This material absorbs and holds small amounts of water in contact with the wet side of the heat exchange plate. Once contacted by a continuous flow of water, this material evenly distributes and maintains a saturation state of its surface area as a result of its wicking properties. As air is passed over the flocked material, the water in that material evaporates thereby evaporatively cooling the heat exchange plate. Outside air passing on the other (dry) side of the heat exchange plate is thereby cooled before it is ultimately discharged into the occupied space. This flocked, rayon-based material, which is bonded to plastic such as polyvinyl chloride (PVC), is available from Flock Tex Incorporated, Woonsocket, R.I. and is sold under the Flock-Tex trademark (www.flocktex.com).

Another feature of this invention that contributes to the uniform wetting of the flocked heat exchange plates is an improved water distribution manifold. More specifically, applicants utilize porous plastic piping in their manifold to evenly supply and distribute water to the heat exchange plates of the indirect cooling stage of the IDEC. This porous plastic material is also used to distribute water to the foraminous material used in the direct cooling section of the IDEC. One type of porous plastic piping found particularly useful by applicants is porous high density polyethylene (HDPE) piping manufactured by Porex Corporation located in Fairburn, Ga. (www.porex.com).

The indirect cooling section of applicants' IDEC unit disclosed in Davis II includes parallel heat exchange plates to separate the wet and dry passages through the heat exchanger. The alternating wet and dry passages are formed by folding individual plastic sheeting, for example sheets made of PVC or polyethylene, into a U-shape. To create separate wet and dry passages through the heat exchanger, it is necessary to effectively seal a portion of the upper edges of alternating wet and dry passages at the top of the U-shaped plate pairs. More specifically, air that is to be conditioned enters open passages into the dry side of the heat exchanger plates toward the back of the heat exchanger immediately below a blower fan used to force air through the system. Conversely the alternating wet passages (surfaces) in the indirect cooling stage are closed in the area immediately beneath the blower so that the air exiting the blower does not enter the wet passages at this point.

The forward (toward the conditioned air exit) portion of the upper surface of the wet passages in the indirect cooling section of the IDEC must, however, be open to receive water needed to evaporatively cool the plates of the heat exchanger. Thus, the upper edges of the wet passages immediately below the fan blower exit must be closed, yet provide for an opening to receive water elsewhere on that upper edge. This arrangement of openings is achieved by applicants' use of a unique clamping arrangement of the plates across the top of the indirect cooling section of the IDEC. More specifically, across the area under the blower, the folded plates forming the wet passages are clamped together with a rigid, corrosion-resistant U-shaped retaining clamp, preferably stainless steel or aluminum. In the area under the water manifold the plates leading to the dry passages are clamped together to restrict entrance of water to those passages, while conversely channeling water from the manifold into the wet passages.

The water path from manifold into the wet passages is further assisted if the preferred porous plastic piping used in the manifold is in physical contact with the U-shaped clamps immediately under the manifold. Such contact improves the water flow from the manifold into the wet side of the plates. To further improve water flow into and through the wet side passages, the upper end of the wet passages preferably contains a water channel or groove from the front to back of the wet (flocked) side of the wet passage plate. This channel collects water from the manifold and the water therein flows to the back of the plate, thereby insuring complete wetting of the wet passages from front to back.

The direct cooling section of applicants' IDEC includes a foraminous member which is wetted by the same type of porous piping used to wet the indirect cooling section. The foraminous member, typically a cellulose material, is preferably formed as corrugated sheets with a multiplicity of polygonally shaped openings such as that described is U.S. Pat. No. 4,562,015 issued Dec. 31, 1985 to the Munters Corporation of Ft. Myers, Fla. This material is sold by the Munters Corporation under the trademark Celdek (www-.munters.com). The direct cooling section of applicants' IDEC cleanses, humidifies and further cools the air previously conditioned in the indirect cooling section.

The air flow pattern through applicants' IDEC is generally as described in Davis II. All air processed through this system is fresh, outside air which fills the area to be conditioned and exits through roof or attic vents. Internal recirculated air is not used. Outside, low humidity air, at a typical temperature of 90°110° F. is drawn into the system with a fan powered by AC or DC as described above. The outside air exits the fan in an area above a portion of the plates of the indirect stage of the system. In this area of the plates, the entrance to the wet side of the plates is blocked by the U-shaped clamps as previously described. This channels the entering outside air into the dry passages within the plates. Within the dry passages, the hot outside air is in contact with the plate surfaces that are being cooled by evaporation of water on the wet side of that plate in the indirect stage of the IDEC. Passage of low humidity hot air through the indirect stage typically lowers the temperature of the air by about 10 to 20° F. The air temperature is further lowered by evaporative cooling in the direct stage so that it exits the IDEC into the conditioned space at a temperature of about 68° F.

Because the foraminous member in the direct stage of the IDEC is relatively dense and provides some resistance to air flow, not all air leaving the indirect stage passes through the direct stage into the conditioned space. About twenty percent (20%) of the air exiting the dry passages of the indirect stage is deflected back into the parallel wet passages of the indirect stage to promote evaporative cooling. After passing over the surfaces of the wet passages, the air exits the IDEC into the outside air as an exhaust gas, typically at a temperature of about 80° F.

As described in Davis II a rotationally molded outer housing or cabinet is preferably used to contain all components of the IDEC, including blower, indirect and direct cooling stages, and sump that holds water that is pumped to the manifold. This outer cabinet is rigid with its front opening (conditioned space side) designed to hold the front face of the direct cooling stage described above. Immediately behind this section is the indirect cooling stage containing the folded plates also described above. It is important that these indirect and direct stages be serviceable, i.e., removable from the cabinet because they sometimes get fouled with water minerals or otherwise lose their capacity to cool air. Applicant's arrangement of plates facilitates this serviceability by providing structural integrity for groups of plates in the indirect cooling stage. More specifically, the aforementioned rigid, preferably stainless steel, clamps at the top of the indirect cooling plates, plus the relatively rigid material used in the plates, preferably PVC, provide a structural backbone for the plates that holds them in a semi-rigid state that facilitates their insertion, removal and replacement in the cabinet.

Applicants' apparatus also solves another problem with prior art IDECs, namely, potential overflow and flooding problems. IDECs can be located in attics or furnished spaces of residences. If the sump in the bottom of the IDEC overflows, water damage to the underlying residential space may occur. To prevent this from occurring applicants' IDEC has an emergency overflow drain and shutoff switch, if and when, water rises to an overflow level in the sump.

BRIEF DESCRIPTION OF THE DRAWINGS

FIG. 4 is a schematic top plan view showing a water distribution manifold supplying water to the indirect and direct evaporative cooling stages of the IDEC system.

FIG. 6 is a side elevational view of the indirect evaporative cooling plates of the invention.

FIG. 7 is a top plan view of several assembled indirect evaporative cooling plates.

FIG. 8 is a fragmental cross sectional view in elevation taken along line 8—8 of FIG. 6.

FIG. 9 is top plan view of the water distribution manifold of this invention.

FIG. 10 is a cross sectional end view taken along lines 10—10 of FIG. 9.

FIG. 11 is a front elevational view showing the coated water contact (wet) surface of a typical indirect evaporative cooling plate.

FIG. 12 is a front elevational view of the uncoated (dry) surface of a typical indirect evaporative cooling plate.

DETAILED DESCRIPTION OF THE INVENTION

Figure 1:
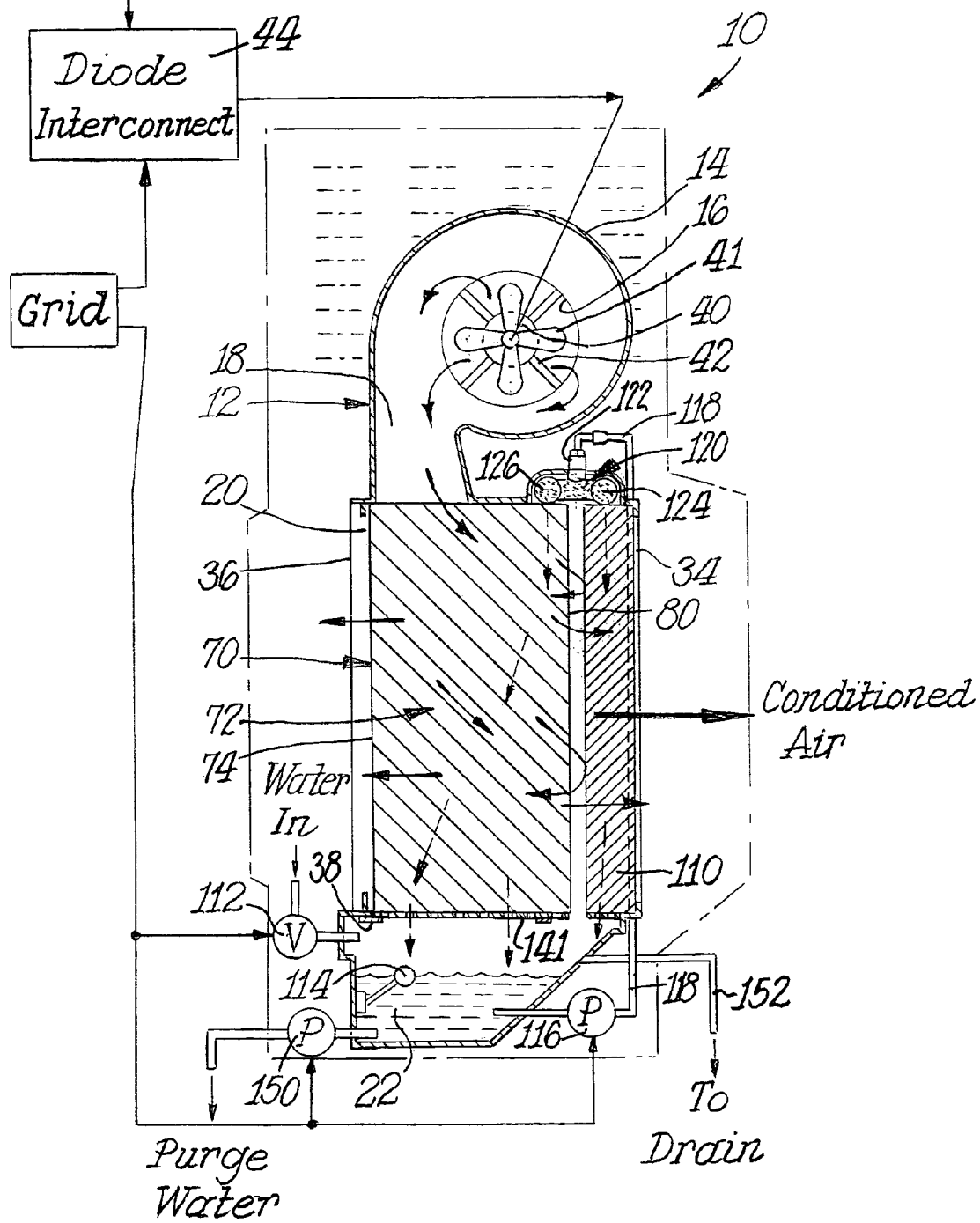
FIG. 1 is a schematic drawing showing the overall system for powering the claimed evaporative cooling system from a sustainable energy source.
Figure 2:
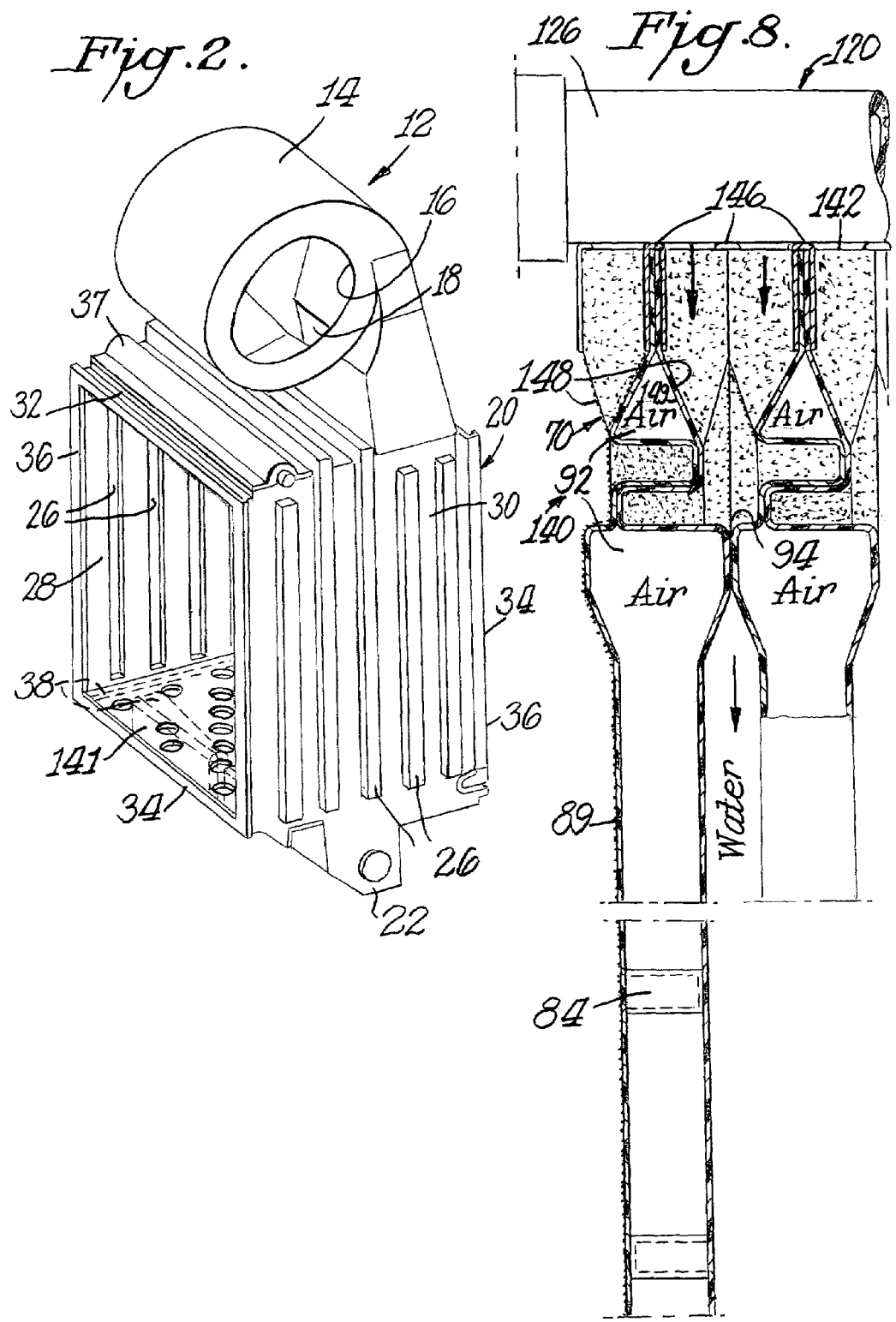
FIG. 2 is an isometric view of the molded cabinet containing components of the evaporative cooling system.

The basic components of applicants' IDEC 10 are schematically illustrated in FIG. 1. These components are preferably housed in a cabinet 12 which is molded as a single plastic part as shown in FIG. 2. This one piece plastic construction of the cabinet 12 promotes ease of manufacture and reduces corrosion issues as noted in Davis II. This approach also facilitates assembly and replacement of parts in the cabinet of 12.

For simplicity sake, the arrangement and function of basic sections of the cabinet 12 will be described in a top-to-bottom sequence. The upper end 14 (as viewed in FIG. 1) of the cabinet 12 has a volute shape with a generally circular outside air inlet 16 and a larger, generally rectangular air outlet discharge 18. The air outlet discharge 18 transitions into the larger, generally rectangular cross-sectional body 20 of cabinet 12. A reservoir chamber 22 at the bottom of cabinet 12 rounds out the basic sections of the cabinet 12, which is preferably formed as a rotationally molded product.

To enhance structural integrity of cabinet 12, it should be molded with structural ribs 26 in a manner known to those skilled in the art (See FIG. 2). This structural integrity is preferably built into the sides 28, 30 and top 32 of cabinet body 20 as illustrated in FIG. 2. The front 34 of cabinet 12 through which conditioned air passes and rear 36 of cabinet body 20 through which exhaust air passes are essentially open to discharge these air flows from the cabinet 12 (See FIG. 2). In addition, expanded area 37 of body 20 is formed into the top 32 of body 20 of cabinet 12 to facilitate introduction of water. Ribs 38 on the inside of cabinet body 20 can also be molded into cabinet 12 to support the cooling plates as discussed in more detail below.

As shown in FIG. 1, fan motor 40 is mounted within upper end 14 of cabinet 12. More particularly, brackets 42 attached to the air inlet 16 of the upper end 14 of cabinet 20 are used to mount a fan in spaced relationship to the periphery of air inlet 16. A squirrel cage blower or fan 41 is mounted on the shaft of motor 40 in a known manner to draw outside air through air inlet 16 and force it through air discharge 18 into the body 20 of cabinet 12. Fan Motor 40 operates at variable speeds that are selected to meet the variable cooling loads experienced by a user of the IDEC 10. A preferred motor 40 for use in applicant's system is an electronically-commutated motor (ECM) which enables variable speed operation at high efficiency. ECMs are essentially parallel-wound direct current (DC) motors that can make efficient use of electric energy from both DC and AC power sources.

The motor 40 having particular application in this invention is one that can selectively use DC power, for example, from a photovoltaic (PV) source such as a solar panel, and/or AC power supplied from a utility's power grid. In this way, power can be supplied to the motor 40 based on its availability. Since availability of PV energy is likely to be at a maximum on the hottest, sunniest days of the year when utilities are working to meet peak demand, the disclosed system can be run by PV power without adding to that peak demand.

ECM fan motors 40 found to have these desired system operating characteristics are sold by General Electric Company as the "GE ECM 2.3 series". Details of their operation are provided at www.geindustrial.com/cwc/products? Some operational features are also shown in U.S. Pat. No. 4,757, 241 issued Jul. 12, 1988.

Since the ECM motor of choice basically operates on direct current (DC) its use, without adaptation, would not be particularly useful in the claimed system which is operated from both AC and DC sources and combinations of such sources. Accordingly, applicants have connected the ECM motor to both sources through the diode interconnect box 44 illustrated in FIGS. 1 and 3. As shown in FIG. 1, DC power from a sustainable power source, for example, a solar panel, and AC power from a utility power grid are fed to the diode interconnect box 44 and power from that box is fed to fan motor 40.

Figure 3:
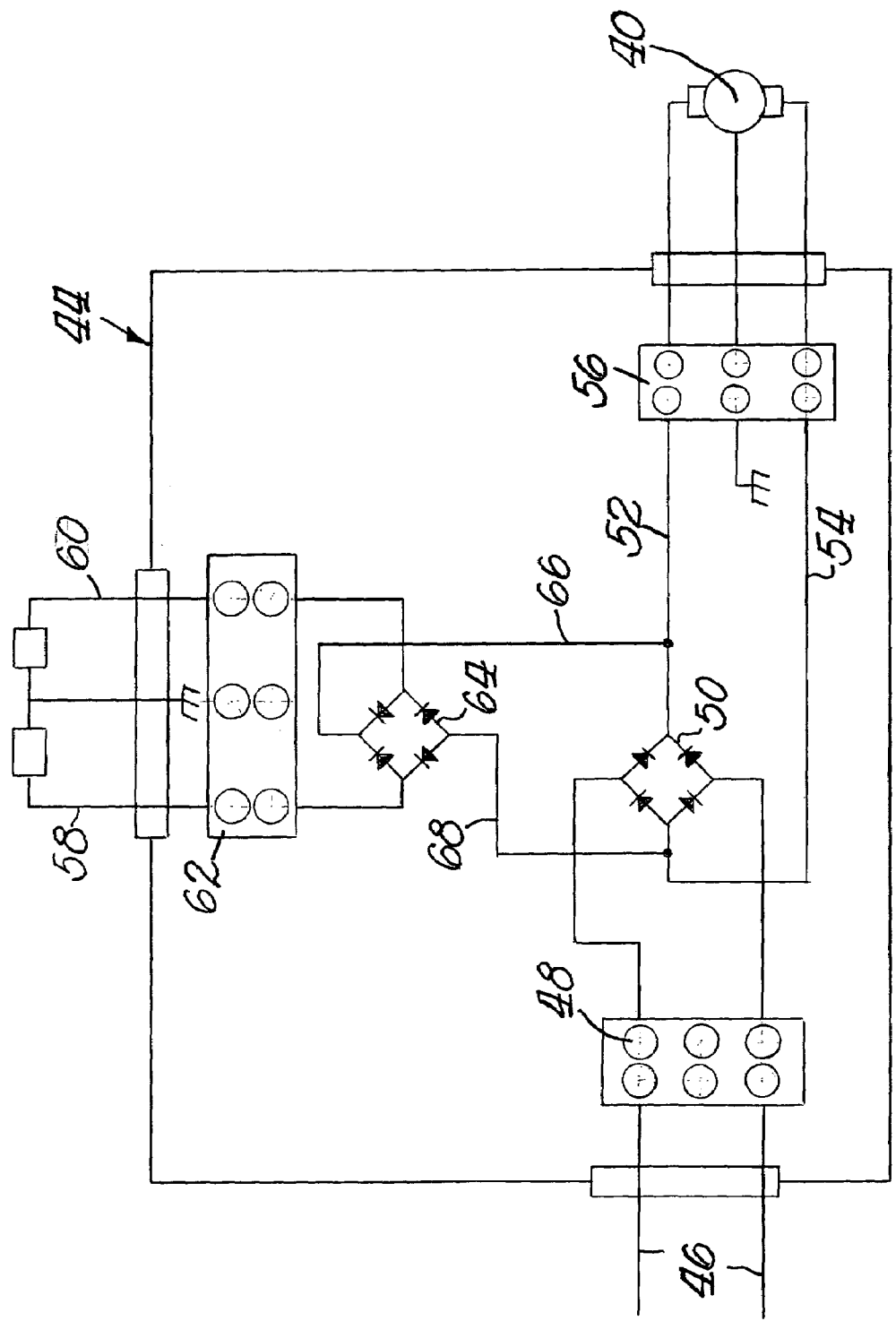
FIG. 3 is a schematic design of the electrical interconnects providing seamless supply of power from multiple power sources.

The diode interconnection of these power sources with fan motor 40 is schematically illustrated in FIG. 3. AC power 46 from the grid is fed to terminal block 48 within box 44 which in turn is electrically connected to a diode bridge 50 which rectifies the AC input into positive and negative DC power. That DC power is fed over lines 52, 54, respectively, to the ECM motor through terminal block 56 in diode interconnect box 44. DC power from, for example, an array of PV solar cells, is fed via lines 58, 60 to terminal block 62 to a second diode bridge 64. The positive DC output of bridge 64 is fed by line 66 to line 52 containing the positive DC output exiting diode bridge 50. The negative DC output line 68 from diode bridge 64 is fed to line 54 carrying the negative output of diode bridge 50. This unique use of diodes avoids many of the problems with inverters used to control power from AC and DC sources such as the system disclosed in U.S. Pat. No. 4,697,136 described above.

Figure 5:
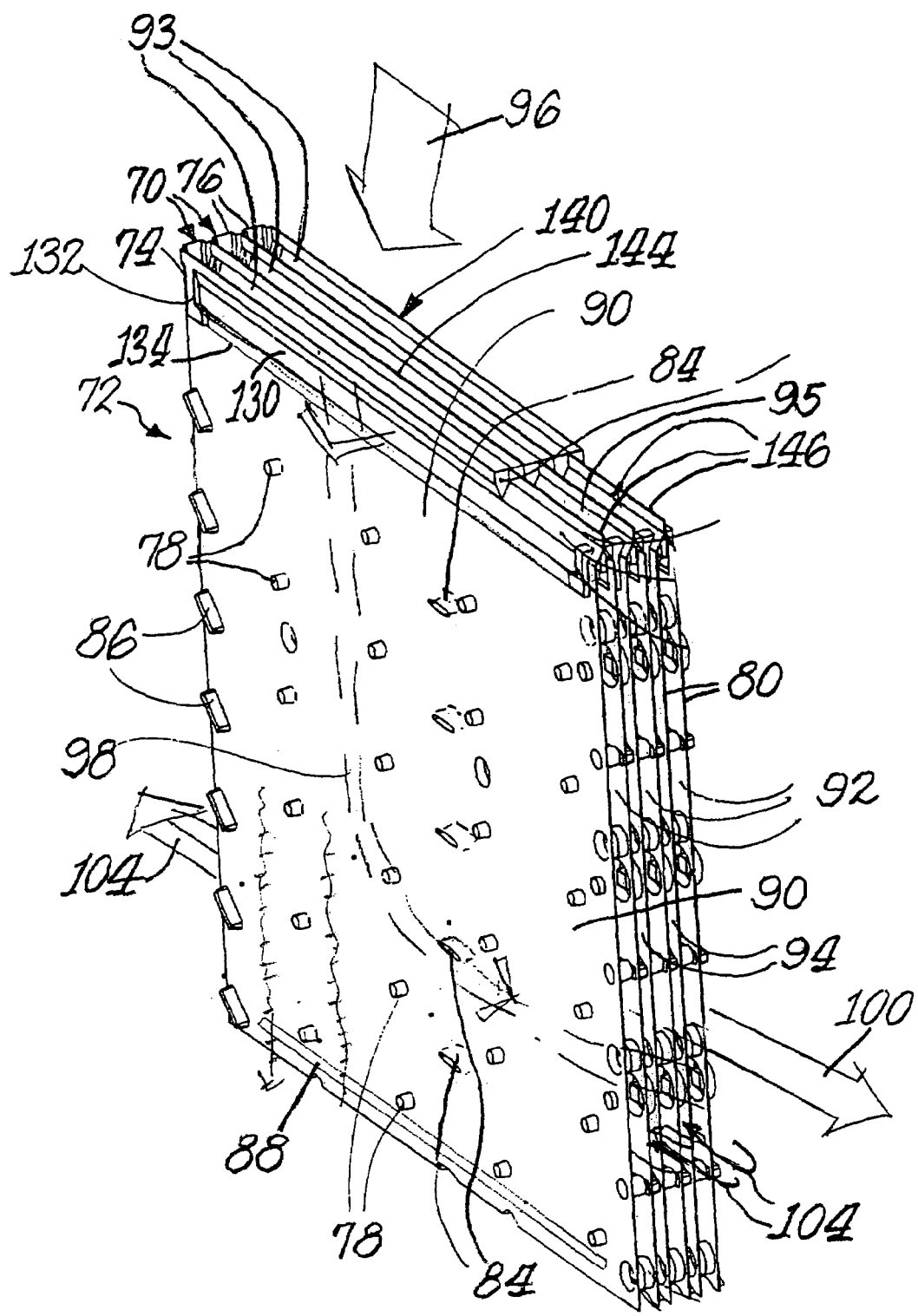
FIG. 5 is a perspective view of an array of indirect evaporation cooling plates and the air flow therethrough.

As previously noted, the cooling efficiency of any IDEC is related to the amount of evaporation that occurs within it. Degree of evaporation, in turn, is a function of the amount of water evaporated. That depends to a large measure on the amount and area of water available for evaporation. In applicant's IDEC, these twin goals for improved evaporation are achieved in part with heat exchange plates 70 having a unique configuration, coating and clamping. The plates 70 can be formed in a thermoforming process that processes a roll of plastic material, preferably polyvinylchloride (PVC). The plates 70 are thermoformed with various surface features which facilitate their assembly into an indirect cooling section 72 of IDEC 10. Preferably, the plates are formed as pairs about vertical centerlines 74. The plates are folded along these centerlines 74 to form a folded edge 76 that eliminates the need to seal that back edge (FIG. 5). Other features formed in the plastic heat exchange sheets 70 include spacers 78 that keep the individual sides of each plate pair separated to facilitate passage of air between plates. The front edge 80 of the plate pairs have interlocking snaps 82 that fasten the open edge 80 of the plate pairs in a spaced parallel orientation one to the other. Other snaps 82 strategically placed throughout the plate 70 help to maintain the structural integrity of the plate pairs when folded (See FIG. 6).

Also formed in the plates are air diverters 84 and 86 that act as air foils directing air exiting from the air discharge area 18 throughout the area within the dry passages. The bottom edge of the plates contain thermoformed ridges 88 that align with each other to form a barrier to air, but not water, passage out of the bottom of plates 70.

After thermoforming the plates 70 with the various centerlines, diverters and snaps just described, the side of plate 70 that is exposed to water (the "wet" side) is coated with a hydrophilic material. While some suppliers of IDEC's, for example Adobe Air, Inc. mentioned above, have used hydrophilic material such as polyester in the indirect cooling sections of their IDECs, these materials have been found deficient for a variety of reasons. Some of these materials, for instance, have a tendency to foam when wetted which reduces effectiveness. Others have not shown the durability needed to operate over long periods of time. Applicants have found a hydrophilic material 89 having substantially improved wetting and durability characteristics for use in IDEC's. This material is a flocked rayon material sold by Flock Tex Incorporated of Woonsocket, R.I. (www.flocktex.com) under the Flock Tex tradename. The Flock Tex material used as the hydrophilic layer 89 on plates 70 is a random cut rayon with an approximate length of 0.020 inches and pile height of 0.005 inches. It has a density of about 1.3 ounces per square yard when applied to plates 70. It is affixed to heat exchange plate 70 with an adhesive such as a vinyl acetate momoner.

The flocked rayon coated plates 70, forming the indirect cooling section 72, as mentioned above, are assembled in pairs around centerlines 74 so that the back edge 76 is closed and the front edges 80 are open. The thermoformed ridges 88 in the bottom of the plate pairs 70 are turned toward each other to block air flow out of the dry side of the plates, thereby assuring that substantially all air from fan 40 will pass out the front end of the plate pairs in a manner described herein. On the wet side of the plates, there is no corresponding ridge 88 and the water on that side of plates 70 flows by gravity into reservoir 22.

FIG. 5 is a perspective view of the indirect heat exchange plates showing both air and water flow patterns according to a preferred embodiment of the present invention. The indirect cooling section 72 uses parallel heat exchange plates 70 to separate dry passages 92 and wet passages 94. The entering airstream travels vertically downward as it leaves the air discharge area 18 and enters the dry passages 92 along their top back zone, where it is collectively referred to as airstream 96 that divides among the dry passages 92. The heat exchange plates 70 are shaped such that the wet passages 94 are closed where they face the air discharge area 18 so that air leaving the fan blower 40 does not directly enter the wet passages 94. Airstream 98 within the plates 70 is assisted in its movement therethrough by air diverters 84 and 86. Upon exiting the dry passages 92, airstream 98 divides into two air streams. Airstream 100 continues in the same direction as airstream 98 and enters the direct cooling stage 110, the other airstream 104 turns 180° and enters the wet passages 94.

The water distribution route through wet passages 94 is illustrated in FIGS. 1 and 4. Water is introduced to the reservoir 22 via a fill valve 112 that may be electronically controlled based on the position of a float switch 114. A pump 116 circulates water from the reservoir 22 through a distribution pipe 118 to the top of the unit, whereupon water enters a distribution manifold 120 that apportions water to both the indirect cooling section 72 and the direct cooling section 110 of IDEC 10. Water that is not evaporated flows downward by gravity through both stages and then back to the water reservoir 22. In the process it distributes water through the direct cooling stage 110 and the surfaces of the wet passages 94 of the indirect cooling section 72. Water in the indirect cooling section 72 and the direct cooling section 110 is evaporated by airstreams forced by fan blower 40. Water from the pump 116 is continuously recirculated during IDEC operation.

As noted above, several approaches to water distribution in IDECs have been proposed. Each one has drawbacks because the distribution is not uniform across the entire width of the indirect cooling section 72. Applicants have overcome this problem by fabricating their manifold 120 from a unique porous material made by Porex Corporation. As noted above, this material uniformly "sweats" or passes water through its perimeter thus providing uniform water distribution over the length of the manifold. As illustrated in FIGS. 4, 9–10, the manifold 120 preferably has a central inlet 122 which supplies an "H"-shaped fixture that is hydraulically linked to two branches, one of which 124 extends above the direct cooling section 110 of the IDEC 10 and the other 126 above the indirect cooling section 72 of the IDEC 10. Both branches 124, 126 of manifold 120 are preferably made of POREX® S40C tubing. This tubing is a sintered, high density polyethylene material with a porous structure and is available in a wide variety of sizes and shapes. Porex also offers porous fittings for use with this tubing, such as end caps and supply fittings 122, thereby insuring complete uniformity of water distribution across the entire width of the indirect 72 and direct 110 evaporative cooling sections.

FIGS. 5–7 show the top edges of the indirect cooling section 72 and show in detail dry passage inlets 93 and wet passage inlets 95. The dry passage inlets 93 are located beneath the air discharge area 18 of cabinet 12 and the heat exchange plates 70 taper toward one another to close the wet passages to prevent air leaving from blower 40 from entering the wet passages 94. Openings to the wet passages 95 are located beneath branch 126 of the distribution manifold 120. Water leaving the manifold 120 enters the wet passage inlets 95. Directly beneath each wet passage inlet 95 is a horizontal trough 130 extending above the entire width of each plate 70 and spanning between each pair of heat exchange plates facing the wet passages 94. Vertical barrier segments 132 prevent water from spilling out the ends of the troughs 130. The bottom 134 of trough 130 is designed such that, with sufficient water supply from manifold 120, water will flow the width of each wet passage 94. In one preferred embodiment, each trough 130 is formed by mating "mirror-image" troughs projecting from adjacent plate surfaces. These troughs 130 are formed as part of the thermoforming process as described above.

One aspect of this invention is the separation of air from water within the indirect cooling section 72. To achieve this separation, the folded heat exchange plate pairs 70 are assembled into an array 140 of multiple plates, a few of which are illustrated in FIG. 7 in top plan view. A typical IDEC 10 having a 2–3 ton cooling capacity and utilizing the features disclosed herein would have about 45–50 plate pairs 70. Those plate pairs can be readily inserted in the rear 36 of cabinet body 20 and supported on a perforated base 141 which in turn is supported therein by ribs 38 in that housing (FIG. 2). Removal of plates 70 for repair or replacement is a simple matter of compressing the array 140 of plates 70 and sliding it out of the rear 36 of cabinet body 20.

As previously discussed, air flow 96 from fan 40 must be directed to the dry side of plates 70 whereas water must be directed to the wet side of plates 70 containing the hydrophilic material 89. This separation occurs at the top edge 142 of the plate array 140. More particularly, adjoining plate pairs 70 created by folding the thermoformed plastic along centerline 74 are clamped along the top edge 142 of the array. The clamping material found best suited to this application is a bendable strip of hardened stainless steel or aluminum. These clamps are used in two different locations along the top edge 142 of array 140. One clamp 144 is located under the air discharge area 18 of cabinet 12 and the other clamping strip 146 is located beneath the water manifold pipe 126 (See FIGS. 6–7). Clamping strip 144 clamps adjoining plate pairs 70 as shown in FIGS. 5, 7 to open air flow into the dry passage 92 between the dry sides 149 of plates 70. Clamping strips 146 close that passage and force water flowing from manifold pipe 126 into wet passages 94 on the side of plates 70 containing the hydrophilic material 89.

The porous tubing 126 of manifold 120 is preferably oriented so that it touches clamp 146 as illustrated in FIG. 8. This contact promotes the flow of water from porous tubing 126 at the point of contact. This flow increases the supply of water directly onto the wet side 89 of plates 70 and then into wet passages 94. FIG. 8 is a cross sectional view of an upper portion of plates 70 illustrating water and air flow through the array 140.

The direct cooling section 110 of IDEC 10 is located near the front 34 of cabinet body 20. It comprises an evaporative medium made from fluted sheets of a cellulosic paper, the flutes of one sheet being arranged at an angle to the next sheet. The cellulosic paper is typically treated with a preservative. An example of commercially available treated cellulosic cross-fluted paper is that produced by Munters Corporation of Ft. Myers, Fla. under the Trademark CELdek® (www.munters.com). This material is described in more detail in U.S. Pat. Nos. 4,562,015 and 4,427,607, the disclosures of which are incorporated by reference herein. Water is supplied to the direct cooling section by water manifold 124. As in the indirect stage, the manifold is preferably in direct contact with the evaporative medium in the direct stage.

A problem associated with operation of IDEC's is contamination of the water recirculated through the unit. This is overcome in applicants' unit by having a periodic purge cycle programmed into the operational controls of the unit. On a preprogrammed cycle purge pump 150 is activated to empty the reservoir 22 to a drain. The reservoir 22 is then refilled with fresh water through valve 112. Another problem associated with IDEC's is leakage in the rare instance when the reservoir 22 overflows. Since many IDEC's are located in the attics of homes, such overflows can cause real damage. This problem is obviated in applicants IDEC 40 by placing a drain outlet 152 at a high point in the reservoir. The drain outlet 152 can be piped to a sewer or to the outside where it can be put to good use watering vegetation. The operational controls of the IDEC unit can be programmed to shut down the system and sound an alarm if there is flow from the drain outlet 152 over an extended period of time which would suggest a malfunction. This alerts users of the IDEC to perform whatever service is needed to correct that malfunction.

To simplify operation and reduce cost purge pump 150, fill valve 112, circulation, pump 116 and operational controls (not shown) can be operated from grid power as shown in FIG. 1.

We claim:

1. A power system for an indirect-direct evaporative cooling (IDEC) apparatus comprising
    a) photo-voltaic cells arranged in solar panels capable of supplying direct current (DC);
    b) alternating current (AC) supplied by a utility or other source;
    c) a parallel-wound direct current motor connected to a fan capable of forcing air through the IDEC apparatus;
    d) a diode interconnect device; and,
    e) electric wiring connecting the power sources of (a) and (b) with the motor through the diode interconnect device to seamlessly power that motor from either or both power sources.

2. The IDEC power system of claim 1 wherein the diode interconnect device comprises
   a) AC power inputs electrically connected to a first diode bridge;
   b) DC power inputs electrically connected to a second diode bridge;
   c) DC power outputs electronically connected to the first and second diode bridges for supplying DC power to the motor.

3. The IDEC power system of claim 1 wherein the motor is an electronically commutated motor.

4. The IDEC power system of claim 3 wherein power for operating the motor is supplied through the diode interconnect box.

5. The IDEC power system of claim 1 wherein the motor operates at variable speeds.

* * * * *